US008730328B2

(12) United States Patent
Luo et al.

(10) Patent No.: US 8,730,328 B2
(45) Date of Patent: May 20, 2014

(54) FRAME BUFFER FORMAT DETECTION (75) Inventors: Xun Luo, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/606,892

(22) Filed: Sep. 7, 2012

(65) Prior Publication Data

US 2013/0242117 A1    Sep. 19, 2013

Related U.S. Application Data

(60) Provisional application No. 61/544,028, filed on Oct. 6, 2011, provisional application No. 61/548,507, filed on Oct. 18, 2011, provisional application No. 61/605,933, filed on Mar. 2, 2012.

(51) Int. Cl.
*H04N 17/00* (2006.01)
*H04N 17/02* (2006.01)
*H04N 5/232* (2006.01)
*H04N 7/14* (2006.01)
*H04N 7/173* (2011.01)

(52) U.S. Cl.
USPC ............... 348/181; 348/211.3; 348/14.13; 725/109

(58) Field of Classification Search
None
See application file for complete search history.

(56) References Cited

U.S. PATENT DOCUMENTS

| 7,091,980 | B2 | 8/2006 | Tidwell |
| 7,114,174 | B1 * | 9/2006 | Brooks et al. ................. 725/105 |
| 7,365,757 | B1 | 4/2008 | Callway et al. |
| 7,366,406 | B2 | 4/2008 | Hoshino et al. |
| 7,965,837 | B2 | 6/2011 | Kawasaki et al. |
| 7,973,657 | B2 | 7/2011 | Ayed |
| 8,001,260 | B2 | 8/2011 | Labonte et al. |
| 8,051,081 | B2 | 11/2011 | Shahraray et al. |
| 8,094,196 | B2 | 1/2012 | Okamoto et al. |
| 2004/0257434 | A1 * | 12/2004 | Davis et al. ................. 348/14.13 |
| 2005/0030386 | A1 * | 2/2005 | Kamieniecki ............... 348/211.3 |
| 2005/0160468 | A1 * | 7/2005 | Rodriguez et al. ............ 725/109 |
| 2005/0246329 | A1 * | 11/2005 | Milirud et al. ..................... 707/3 |
| 2006/0153291 | A1 | 7/2006 | Christison |
| 2006/0167936 | A1 * | 7/2006 | Okauchi et al. ............ 707/104.1 |
| 2007/0080932 | A1 | 4/2007 | Yang et al. |
| 2009/0006337 | A1 * | 1/2009 | Cheung ............................ 707/3 |

(Continued)

FOREIGN PATENT DOCUMENTS

EP    1199844 A2    4/2002

OTHER PUBLICATIONS

International Search Report and Written Opinion—PCT/US2012/059073—ISA/EPO—Jan. 7, 2013.

*Primary Examiner* — Jefferey Harold
*Assistant Examiner* — Sean Haiem
(74) *Attorney, Agent, or Firm* — Donald C. Kordich (57) ABSTRACT

In an example, a method includes generating a test frame of video data having a first format, and rendering the test frame of video data to a frame buffer, wherein the frame buffer is configured to store video data in a second format. The method also includes reading, from the frame buffer, a return frame of video data, wherein the return frame of video data comprises the video data of the test frame formatted in the second format, and determining the second format based on a comparison of the test frame having the first format and the return frame having the second format.

37 Claims, 7 Drawing Sheets

(56) References Cited

U.S. PATENT DOCUMENTS

| | | |
|---|---|---|
| 2009/0046595 A1 | 2/2009 | Clark |
| 2009/0063686 A1 | 3/2009 | Schmidt et al. |
| 2010/0097946 A1 | 4/2010 | Celentano et al. |
| 2010/0165192 A1 | 7/2010 | Cheng et al. |
| 2010/0254302 A1 | 10/2010 | Jung et al. |
| 2010/0260296 A1 | 10/2010 | Chorney et al. |
| 2010/0293287 A1 | 11/2010 | Kobayashi |
| 2011/0030025 A1 | 2/2011 | Bertonis et al. |
| 2011/0032856 A1* | 2/2011 | Ozawa .......................... 370/310 |
| 2011/0052142 A1 | 3/2011 | Sultenfuss et al. |
| 2011/0069229 A1 | 3/2011 | Lord |
| 2011/0072473 A1 | 3/2011 | Funabiki et al. |
| 2011/0088075 A1 | 4/2011 | Eyer |
| 2011/0115689 A1 | 5/2011 | Sugiyama et al. |
| 2011/0228666 A1 | 9/2011 | Barbieri et al. |
| 2011/0258313 A1 | 10/2011 | Mallik et al. |

* cited by examiner

FRAME BUFFER FORMAT DETECTION

This application claims benefit of U.S. Provisional Application No. 61/544,028, filed Oct. 6, 2011, U.S. Provisional Application No. 61/548,507, filed Oct. 18, 2011, and U.S. Provisional Application No. 61/605,933 filed Mar. 2, 2012, the entire contents of each of which are hereby incorporated by reference.

TECHNICAL FIELD

This disclosure relates to techniques for rendering video data with a computing device.

BACKGROUND

Mobile devices may take the form of mobile telephones, tablet computers, laptop computers, portable computers with wireless communication cards, personal digital assistants (PDAs), digital cameras, video gaming devices, portable media players, flash memory devices with wireless communication capabilities, wireless communication devices including so-called "smart" phones and "smart" pads or tablets, e-readers, or other of a wide variety of other types of portable devices. Mobile devices are becoming increasingly powerful with the addition of high-power processors, the capability to process media content, and the ability to interact with networks in the cloud. These improvements make it possible to develop new usage models for the mobile devices that provide a better user experience and improve productivity.

SUMMARY

The techniques of this disclosure generally relate to independently determining a format of a frame buffer. The manner in which a computing platform stores pixel data to a frame buffer is typically not apparent to applications being executed by the platform. Accordingly, applications must typically interface with, for example, an operating system or other component of the platform to determine a format suitable for storage in a frame buffer. The techniques of this disclosure may determine a frame buffer format without interfacing with other components of the computing platform. For example, the techniques of this disclosure may be implemented to automatically determine the format of a frame buffer by directly communicating with the frame buffer. In some examples, techniques of this disclosure may store a frame having a predetermined format to the frame buffer, read the frame from the frame buffer (now in the format of the frame buffer), and determine the format of the frame buffer based on similarities or differences between the original, predetermined format and the format of the frame as read from the frame buffer.

In an example, aspects of this disclosure relate to a method that includes generating a test frame of video data having a first format, and rendering the test frame of video data directly to a frame buffer, where the frame buffer is configured to store video data in a second format. The method also includes reading, from the frame buffer, a return frame of video data, where the return frame of video data comprises the video data of the test frame formatted in the second format, and determining the second format based on a comparison of the test frame having the first format and the return frame having the second format.

In another example, aspects of this disclosure relate to an apparatus comprising one or more processors configured to generate a test frame of video data having a first format, render the test frame of video data directly to a frame buffer, where the frame buffer is configured to store video data in a second format, read, from the frame buffer, a return frame of video data, where the return frame of video data comprises the video data of the test frame formatted in the second format, and determine the second format based on a comparison of the test frame having the first format and the return frame having the second format.

In another example, aspects of this disclosure relate to a computer program product comprising a computer-readable medium having stored thereon instructions that, when executed, cause one or more processors to generate a test frame of video data having a first format, render the test frame of video data directly to a frame buffer, where the frame buffer is configured to store video data in a second format, read, from the frame buffer, a return frame of video data, where the return frame of video data comprises the video data of the test frame formatted in the second format, and determine the second format based on a comparison of the test frame having the first format and the return frame having the second format.

In another example, aspects of this disclosure relate to an apparatus comprising means for generating a test frame of video data having a first format, means for rendering the test frame of video data directly to a frame buffer, where the frame buffer is configured to store video data in a second format, means for reading, from the frame buffer, a return frame of video data, where the return frame of video data comprises the video data of the test frame formatted in the second format, and means for determining the second format based on a comparison of the test frame having the first format and the return frame having the second format.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure generally relates to techniques for determining a format of a frame buffer included in a computing device. For example, computing devices having a display for displaying video data (such as still images, a series or sequence of images that form a full motion video sequence, computer generated images, and the like) may include a frame buffer to store the data before the data is presented. That is, a frame buffer may store color values for each pixel in an image to be displayed. In some examples, the frame buffer may store color values having 1-bit (monochrome), 4-bits, 8-bits, 16-bits (e.g., so-called High color), 24-bits (e.g., so-called True color), or more (e.g., 30-bit, 36-bit, 48-bit, or even larger bit depths). In addition, the frame buffer may store alpha information that is indicative of pixel transparency.

The particular format in which data is stored to the frame buffer may depend on a variety of factors. For example, a computing device platform, e.g., a combination of software and hardware components, may dictate the manner in which data is rendered and stored to the frame buffer before being presented by a display. In an example for purposes of illustration, an operating system and a display processor of the computing device may be responsible for rendering images and storing the images to the frame buffer. In this example, the operating system and the display processor may store data to the frame buffer in a RGBA8888 format (eight bits assigned to the Red channel, eight bits assigned to the Green channel, eight bits assigned to the Blue channel, and eight bits assigned to the Alpha channel). Alternatively, in another example, the operating system and the display processor may store data to the frame buffer in a BGRA8888 format. Other formats are also possible.

In any case, the manner in which data is stored to the frame buffer is typically not apparent to applications being executed by the platform. For example, even if an application being executed by the platform obtains pixel data from the frame buffer, the application may be unaware of the particular format of the pixel data without additionally interfacing with the platform (e.g., receiving an indication of the frame buffer format from the operating system). Accordingly, applications must typically interface with, for example, an operating system or other component of the platform to determine a format suitable for storage in a frame buffer.

Aspects of this disclosure relate to techniques for determining a frame buffer format without interfacing with other components of the computing platform. For example, certain techniques of this disclosure may be implemented to automatically determine the format of a frame buffer by directly communicating with the frame buffer. In some examples, the techniques of this disclosure may store a frame having a predetermined format to the frame buffer, read the frame from the frame buffer (now in the format of the frame buffer), and determine the format of the frame buffer based on similarities and/or differences between the original, predetermined format and the format of the frame as read from the frame buffer.

Figure 1:
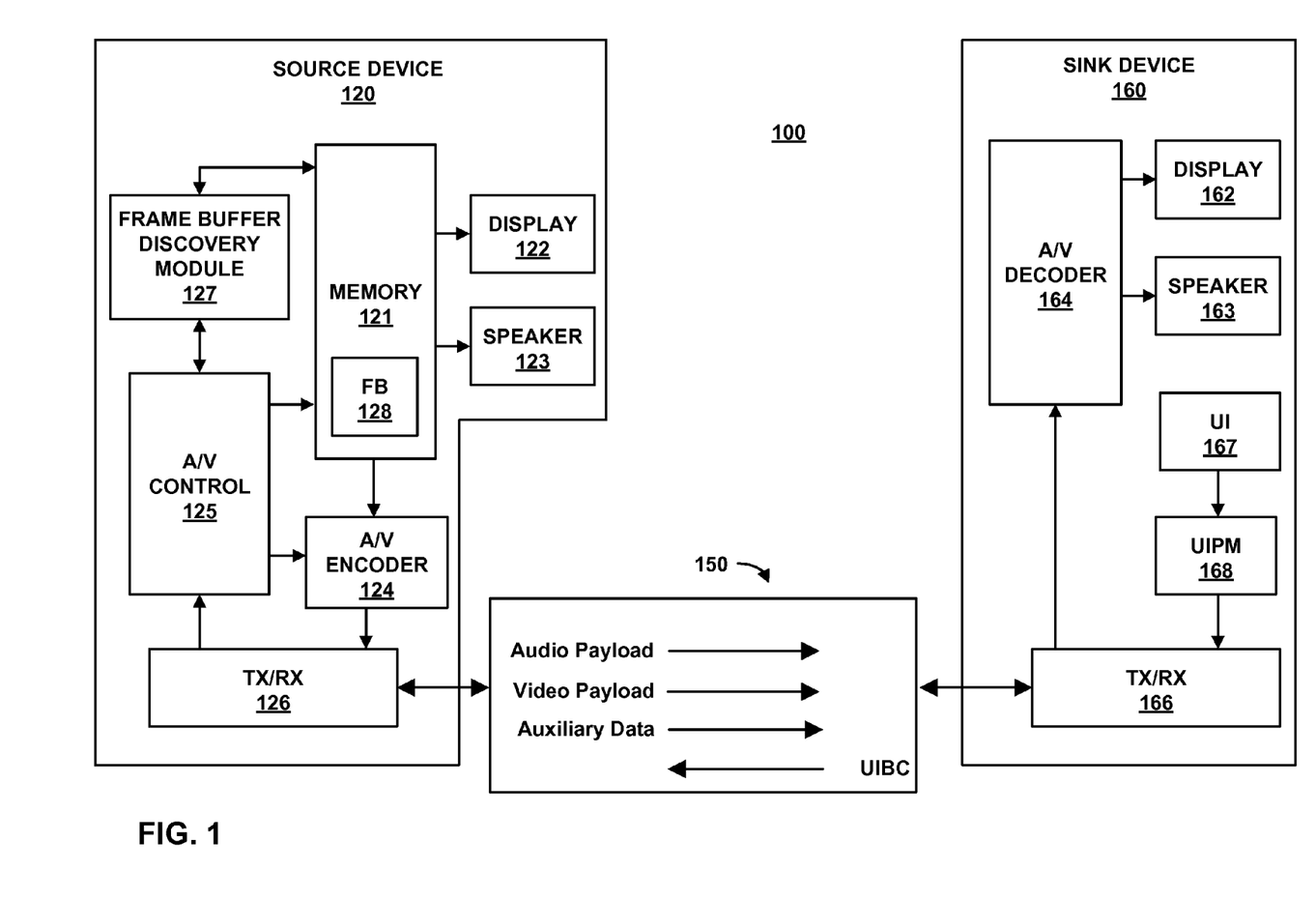
FIG. 1 illustrates an example system that may implement techniques of this disclosure.

FIG. 1 is a block diagram illustrating an exemplary system 100 that may implement techniques of this disclosure. As shown in FIG. 1, system 100 includes source device 120 that communicates with sink device 160 via communication channel 150. Source device 120 need not be physically proximate to sink device 160, as long as a connection can be maintained through communication channel 150.

Source device 120 may include a memory 121 that stores audio/video (A/V) data and includes a frame buffer 128, display 122, speaker 123, audio/video encoder 124 (also referred to as encoder 124), audio/video control module 125, a transmitter/receiver (TX/RX) unit 126, and a frame buffer discovery module 127. Sink device 160 may include display 162, speaker 163, audio/video decoder 164 (also referred to as decoder 164), transmitter/receiver unit 166, user input (UI) device 167, and user input processing module (UIPM) 168. The illustrated components constitute merely one example, and other examples may include fewer components than those illustrated or additional components.

In the example of FIG. 1, source device 120 may display a video portion of A/V data stored in memory 121 on display 122 and may output an audio portion of A/V data stored in memory 121 on speaker 123. The A/V data may include multimedia content such as movies, television shows, or music, but may also include real-time content generated by source device 120. Such real-time content may include, in one example, a video frame of user input options available for a user to select or other computer generated content. In some instances, A/V data may include video frames that are a combination of different types of content, such as a video frame of a movie or TV program that has user input options overlaid the frame of video.

While described as being stored to memory 121 prior to being presented by source device 120, in some examples, A/V data may be accessed from an external storage medium such as a file server, or external storage such as a hard drive, flash memory drive, Blu-ray disc, digital video disc (DVD) or another type of external storage, or may be streamed to source device 120 via a network connection such as the internet. Moreover, in some instances, A/V data may be captured in real-time via a camera and microphone of source device 120. In any case, memory 121 may include frame buffer 128 to store video data (e.g., including still images, motion pictures, computer generated images, and the like) before outputting such content to display 122.

In addition to rendering A/V data locally via display 122 and speaker 123, audio/video encoder 124 of source device 120 may encode A/V data stored in memory 121 and frame buffer 128, and transmitter/receiver unit 126 may transmit the encoded data over communication channel 150 to sink device 160. Furthermore, as described in greater detail below, source device 120 may transmit certain data indicating a frame buffer format of source device 120 to sink device 160 via communication channel 150.

Transmitter/receiver unit 166 of sink device 160 may receive the encoded data, and audio/video decoder 164 may decode the encoded data and output the decoded data via display 162 and speaker 163. In this manner, the audio and video data being rendered by display 122 and speaker 123 can be simultaneously rendered by display 162 and speaker 163. The audio data and video data may be arranged in frames, and the audio frames may be time-synchronized with the video frames when rendered.

Audio/video encoder 124 and audio/video decoder 164 each may be implemented as one or more microprocessors, digital signal processors (DSPs), application specific integrated circuits (ASICs), field programmable gate arrays (FPGAs), discrete logic, software, hardware, firmware or any combinations thereof Each of audio/video encoder 124 and audio/video decoder 164 may be included in one or more encoders or decoders, either of which may be integrated as part of a combined encoder/decoder (CODEC).

Audio/video encoder 124 and audio/video decoder 164 may implement any number of audio and video compression standards, such as the ITU-T H.264 standard, alternatively referred to as MPEG-4, Part 10, Advanced Video Coding (AVC), or the newly emerging high efficiency video coding (HEVC) standard, sometimes called the H.265 standard. Other video compression techniques may also be used, including techniques defined by the older H.263 standard, techniques defined by the open video compression format referred to as VP8, or any other public or proprietary techniques, standards or formats. Generally speaking, audio/video decoder 164 is configured to perform the reciprocal coding operations of audio/video encoder 124. Although not shown in FIG. 1, in some aspects, A/V encoder 124 and A/V decoder 164 may each be integrated with an audio encoder and decoder, and may include appropriate MUX-DEMUX units, or other hardware and software, to handle encoding of both audio and video in a common data stream or separate data streams.

Display 122 and display 162 may comprise any of a variety of video output devices such as a cathode ray tube (CRT), a liquid crystal display (LCD), a plasma display, an organic light emitting diode (OLED) display, or another type of display device. Speaker 123 may comprise any of a variety of audio output devices such as headphones, a single-speaker system, a multi-speaker system, or a surround sound system. Additionally, although display 122 and speaker 123 are shown as part of source device 120 and display 162 and speaker 163 are shown as part of sink device 160, source device 120 and sink device 160 may in fact be a system of devices. As one example, display 162 may be part of a television or projector, speaker 163 may be a surround sound system, and decoder 164 may be part of an external box connected, either wired or wirelessly, to display 162 and speaker 163. In other instances, sink device 160 may be a single device, such as a tablet computer or smartphone. In still other cases, source device 160 and sink device 120 are similar devices, e.g., both being smartphones, tablet computers, or the like. In this case, one device may operate as the source and the other may operate as the sink. These rolls may even be reversed in subsequent communication sessions. In still other cases, source or sink devices may be integrated into appliances, automobiles, aircraft, watercraft or any device that includes display capabilities consistent with the techniques described herein.

Transmitter/receiver unit 126 and transmitter/receiver unit 166 may each include various mixers, filters, amplifiers and other components designed for signal modulation, as well as one or more antennas and other components designed for transmitting and receiving data. Communication channel 150 generally represents any suitable communication medium, or collection of different communication media, for transmitting video data from source device 120 to sink device 160. Communication channel 150 is usually a relatively short-range communication channel, similar to WiFi, Blootooth, or the like. However, communication channel 150 is not necessarily limited in this respect, and may comprise any wireless or wired communication medium, such as a radio frequency (RF) spectrum or one or more physical transmission lines, or any combination of wireless and wired media.

In other examples, communication channel 150 may even form part of a packet-based network, such as a local area network, a wide-area network, or a global network such as the Internet. Source device 120 and sink device 160 may communicate over communication channel using a communications protocol such as a standard from the IEEE 802.11 family of standards, or any other communication protocol or format. Source device 120 and sink device 160 may, for example, communicate according to the Wi-Fi Direct or Wi-Fi Display (WFD) standards, such that source device 120 and sink device 160 communicate directly with one another without the use of an intermediary such as wireless access points or so called hotspots. Source device 120 and sink device 160 may also establish a tunneled direct link setup (TDLS) to avoid or reduce network congestion. WFD and TDLS are intended to setup relatively short-distance communication sessions. Relatively short distance in this context may refer to, for example, less than approximately 70 meters, although in a noisy or obstructed environment the distance between devices may be even shorter, such as less than approximately 35 meters, or less than approximately 20 meters. Communication channel 150 may be infrastructure assisted, or may be peer-to-peer.

Although, FIG. 1 shows communication channel 150 carrying audio payload data, video payload data, and auxiliary data separately, it is to be understood that in some instances any combination of video payload data, audio payload data, and auxiliary data may be part of a common data stream.

In addition to decoding and rendering data received from source device 120, sink device 160 can also receive user inputs from user input device 167. User input device 167 may, for example, be a keyboard, mouse, trackball or track pad, touch screen, voice command recognition module, an electronic pen or stylus or any other such user input device. User input processing module 168, formats user input commands received by user input device 167 into a data packet structure that source device 120 is capable of interpreting. Such data packets are transmitted by transmitter/receiver 166 to source device 120 over communication channel 150.

Transmitter/receiver unit 126 receives the data packets, and A/V control module parses the data packets to interpret the user input command that was received by user input device 167. Based on the command received in the data packet, A/V control module 125 can change the content being encoded and transmitted. In this manner, a user of sink device 160 can control the audio payload data and video payload data being transmitted by source device 120 remotely and without directly interacting with source device 120. Examples of the types of commands a user of sink device 160 may transmit to source device 120 include commands for rewinding, fast forwarding, pausing, and playing audio and video data, as well as commands for zooming, rotating, scrolling, and so on. Users may also make selections, from a menu of options for example, and transmit the selection back to source device 120.

Source device 120 can respond to user inputs applied at wireless sink device 160. In such an interactive application setting, the user inputs applied at wireless sink device 160 may be sent back to the wireless display source over communication channel 150. In one example, a reverse channel architecture, also referred to as a user interface back channel (UIBC) may be implemented to enable sink device 160 to transmit the user inputs applied at sink device 160 to source device 120. The reverse channel architecture may include upper layer messages for transporting user inputs and lower layer frames for negotiating user interface capabilities at sink device 160 and source device 120. The UIBC may reside over the Internet Protocol (IP) transport layer between sink device 160 and source device 120. To promote reliable transmission and in sequence delivery of data packets containing user input data, UIBC may be configured run on top of other packet-based communication protocols such as the transmission control protocol/internet protocol (TCP/IP) or the user datagram protocol (UDP).

In some cases, there may be a mismatch between the user input interfaces located at source device 120 and sink device 160. To resolve the potential problems created by such a mismatch and to promote a good user experience under such circumstances, user input interface capability negotiation may occur between source device 120 and sink device 160 prior to establishing a communication session.

The UIBC may be designed to transport various types of user input data, including cross-platform user input data. For example, source device 120 may run the iOS® operating system, while sink device 160 runs another operating system such as Android® or Windows®. Regardless of platform, UIPM 168 can encapsulate received user input in a form understandable to A/V control module 125. A number of different types of user input formats may be supported by the UIBC so as to allow many different types of source and sink devices to exploit the protocol. Generic input formats may be defined, and platform specific input formats may both be supported, thus providing flexibility in the manner in which user input can be communicated between source device 120 and sink device 160 by the UIBC. In the example of FIG. 1, source device 120 may comprise a mobile telephone, tablet computer, laptop computer, personal digital assistant (PDA), digital camera, video gaming device, portable media player, flash memory device with wireless communication capabilities, smartphone, smartpad or tablet, e-reader, WiFi enabled television, or any other device capable of transmitting audio and/or video data. Sink device 160 may likewise comprise a mobile telephone, tablet computer, laptop computer, personal digital assistant (PDA), digital camera, video gaming device, portable media player, flash memory device with wireless communication capabilities, smartphone, smartpad or tablet, e-reader, WiFi enabled television, or any other device capable of transmitting audio and/or video data. In some examples, sink device 160 may not be configured for wireless communication, but may be connected to a wireless adapter (e.g., a dongle that supports wireless communication).

In some instances, sink device 160 may include a system of devices, such that display 162, speaker 163, UI device 167, and A/V encoder 164 all parts of separate but interoperative devices. Source device 120 may likewise be a system of devices rather than a single device. In many cases, source device 120 and sink device 160 may be similar or identical device, with one device operating as the source and the other operating as the sink. Moreover, these roles may be reversed in different communication sessions. It should be understood that source device 120 and sink device 160 shown in FIG. 1 are provided as examples, and source device 120 and sink device 160 may include additional, fewer, or alternative components and/or arrangements than those shown in FIG. 1.

As noted above, source device 120 need not be positioned in close physical proximity to sink device 160. That is, in an example for purposes of explanation, source device 120 may be a smartphone or tablet computer, while sink device 160 may be a projector device. Source device 120 and sink device 160 may communicate via communication channel 150, which may comprise a homogeneous network (e.g., a WiFi network), or a heterogeneous network (e.g., a combination of one or more networks). Accordingly, a user of source device 120 may be positioned in a first location (e.g., the user's office), while sink device 160 may be positioned in a second location that is remote from the first location (e.g., a conference room).

According to aspects of this disclosure, frame buffer discovery module 127 may be configured to determine a format of frame buffer 128. For example, source device 120 may include frame buffer 128 for storing video data before the data is presented (e.g., by display 122). That is, frame buffer 128 may store color values for each pixel in an image to be displayed. In addition, frame buffer 128 may store alpha information that is indicative of pixel transparency.

The particular format in which data is stored to the frame buffer 128 may depend on a variety of factors. For example, components of source device 120, such as a controller used to drive display 122, an operating system executed by source device 120, or any combination of other components may dictate the manner in which data is stored to frame buffer 128. The manner in which data is stored to frame buffer 128 is typically not apparent to various components or applications without communicating with other components of source device 120. For example, an application being executed by source device 120 may not have access to data indicating the format of frame buffer 128 without communicating with an operating system of source device 120 or other components of source device 120. Accordingly, in order for such an application to generate video data in the appropriate format for frame buffer 128, such an application must be preconfigured to communicate with a particular operating system or other components.

Aspects of this disclosure relate to techniques for determining a format of frame buffer 128 without interfacing with other components (components other than frame buffer 128) of source device 120. For example, according to aspects of this disclosure, frame buffer discovery module 128 may automatically determine the format of frame buffer 128 by directly communicating with frame buffer 128. That is, as described in greater detail below, frame buffer discovery module 127 may generate and store a frame having a predetermined format to frame buffer 128. Frame buffer 128 may store the frame in a format dictated by the platform of source device 120. Frame buffer discovery module 127 may then read stored frame from the frame buffer (now in the format of frame buffer 128), and determining the format of frame buffer 128 based on similarities and/or differences between the original, predetermined format and the format of the frame as read from frame buffer 128.

In this way, the system shown and described with respect to FIG. 1 include a source device 120 that may generate a test frame of video data having a first format and render the test frame of video data directly to a frame buffer (which may be included with A/V data 121). The frame buffer may be configured to store video data in a second format. Source device 120 may read, from the frame buffer, a return frame of video data that includes the video data of the test frame formatted in the second format. Source device 120 may determine the second format based on a comparison of the test frame having the first format and the return frame having the second format. In other examples, as described in greater detail below, this process may be remotely performed by sink device 160.

The techniques of this disclosure may provide flexible access to frame buffer 128. That is, because the frame buffer format detection process described above may be performed without interfacing with components of source device 120, the techniques may be implemented regardless of the particular configuration of source device. Accordingly, an application implementing the techniques of this disclosure may operate on a multitude of platforms and without being tailored to work with a specific platform.

Figure 2:
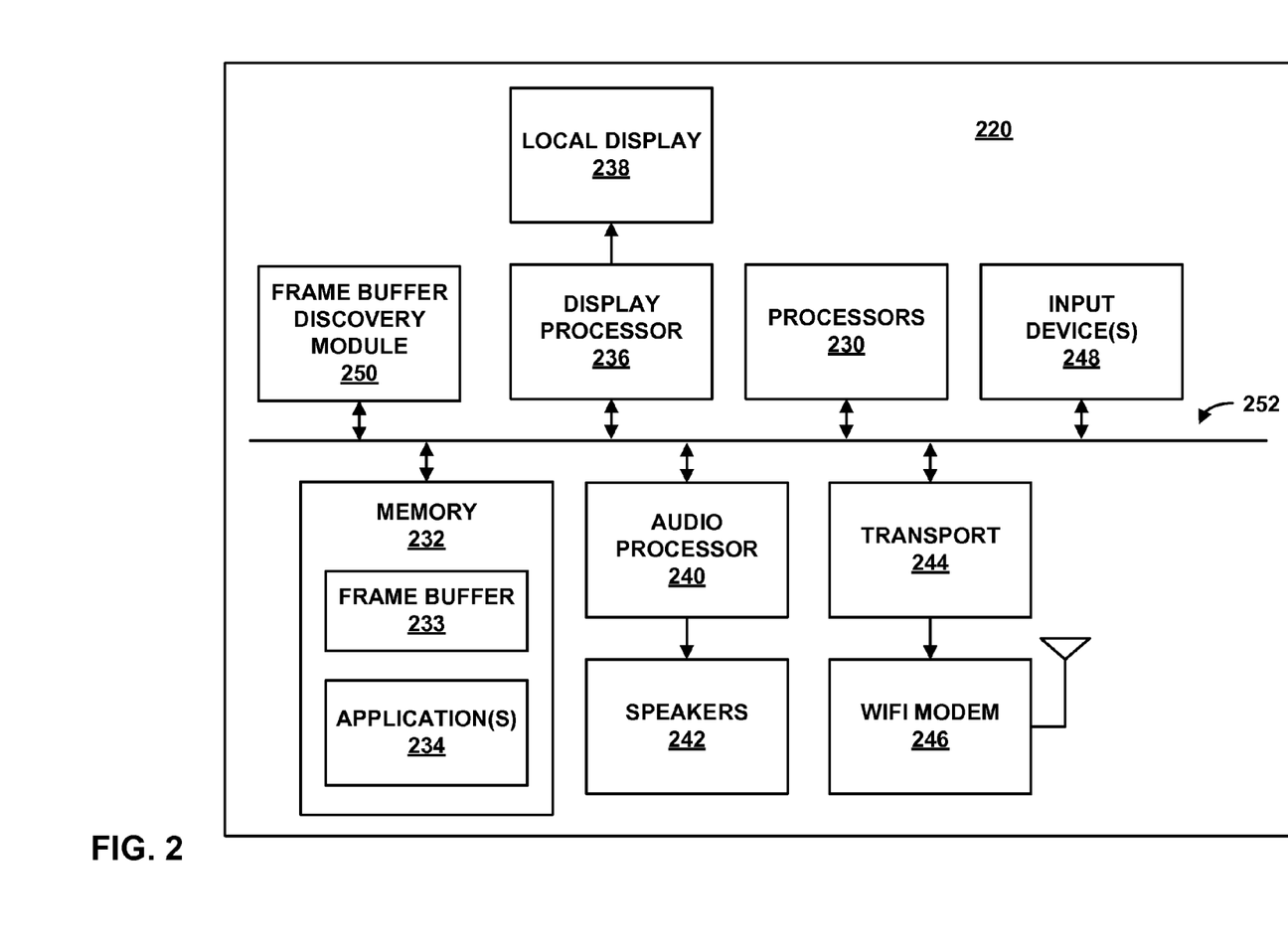
FIG. 2 illustrates an example source device that may implement techniques of this disclosure.

FIG. 2 is a block diagram showing one example of a source device 220 that may be configured to implement the techniques of this disclosure. In some examples, source device 220 may be configured similarly to source device 120 shown in FIG. 1. In the example shown in FIG. 2, source device 220 includes one or more processors 230, memory 232 having a frame buffer 233 and storing one or more applications 234, display processor 236, local display 238, audio processor 240, speakers 242, transport module 244, wireless modem 246, input devices 248 and frame buffer discovery module 250. Other examples may include more or fewer components than those shown in FIG. 2. In addition, while certain components are described separately for purposes of discussion, it should be understood that some components shown and described with respect to FIG. 2 may be highly integrated or combined to form a single component.

Each of components 230, 232, 236, 240, 244, 248, and 250 may be interconnected (physically, communicatively, and/or operatively) for inter-component communications via communication channels 252. In some examples, communication channels 252 may include a system bus, network connection, inter process communication data structure, or any other channel for communicating data.

One or more processors 230 may be capable of processing instructions stored in storage device memory 232. Processors 230 may include, for example, one or more microprocessors, DSPs, ASICs, FPGAs, discrete logic, or any combinations thereof In some examples, processors 230 may be configured to encode and/or decode A/V data for transport, storage, and display.

Memory 232 of FIG. 2 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), magnetic random access memory (MRAM), FLASH memory, and the like, Memory 232 may comprise a computer-readable storage medium for storing audio/video data, as well as other kinds of data. In the example shown in FIG. 2, memory 232 includes frame buffer 233.

In some examples, memory 232 may store applications 234 that are executed by processor 230 as part of performing the various techniques described in this disclosure. Memory 232 may also store certain A/V data for presentation by source device 220 or a sink device (such as sink device 160 shown in FIG. 1). For example, memory 232 may store an entire A/V file, or may comprise a smaller buffer that simply stores a portion of an A/V file, e.g., streamed from another device or source. In any event, frame buffer 233 of memory 232 may buffer A/V data before the data is presented by source device 220.

In some examples, source device 220 may locally process and display A/V data. In particular, display processor 236 may form a portion of a platform for processing video data to be displayed on local display 238. Display 238 may include a cathode ray tube (CRT) monitor, a liquid crystal display (LCD), or any other type of device that can generate intelligible output to a user. In addition, audio processor 240 may process audio data for output on one or more speakers 242.

Transport module 244 may process encoded A/V data for a network transport. For example, encoded A/V data may be processed by processors 230 and encapsulated by transport module 244 into Network Access Layer (NAL) units for communication across a network. The NAL units may be sent by wireless modem 246 to a wireless sink device via a network connection. As described above with reference to source device 120 of FIG. 1, source device 220 may also receive user input commands from a sink device. In this manner, wireless modem 246 of source device 220 receives encapsulated data packets, such as NAL units, and sends the encapsulated data units to transport unit 244 for decapsulation. For instance, transport unit 244 may extract data packets from the NAL units, and processors 230 can parse the data packets to extract the user input commands. Based on the user input commands, processors 230 can adjust the encoded A/V data being transmitted by source device 220 to a sink device.

One or more input devices 248 may be configured to receive input from a user through tactile, audio, or video feedback. Examples of input device 42 include a touch sensitive screen, a mouse, a keyboard, a voice responsive system, video camera, microphone or any other type of device for detecting a command from a user.

Frame buffer discovery module 250 may include any combination of software and hardware components for determining a format of frame buffer 233. That is, while described as a module to emphasize functional aspects, frame buffer discovery module 250 does not necessarily require realization by one or more hardware units. Rather, the functionality of frame buffer discovery module 250 may be accomplished by a collection of interoperative hardware units, including one or more processors, in conjunction with suitable software and/or firmware.

In any case, according to aspects of this disclosure, frame buffer discovery module 250 may automatically determine the format of frame buffer 233 by directly communicating with frame buffer 233. That is, as described in greater detail below, frame buffer discovery module 250 may generate and store a frame having a predetermined format to frame buffer 233. Frame buffer 233 may store the frame in a format dictated by the platform of source device 220 (including, for example, display processor 236, processors 230, applications 234 and the like). Frame buffer discovery module 250 may then read stored frame from the frame buffer (now in the format of frame buffer 233), and determine the format of frame buffer 233 based on similarities and/or differences between the original, predetermined format and the format of the frame as read from frame buffer 233.

Figure 3:
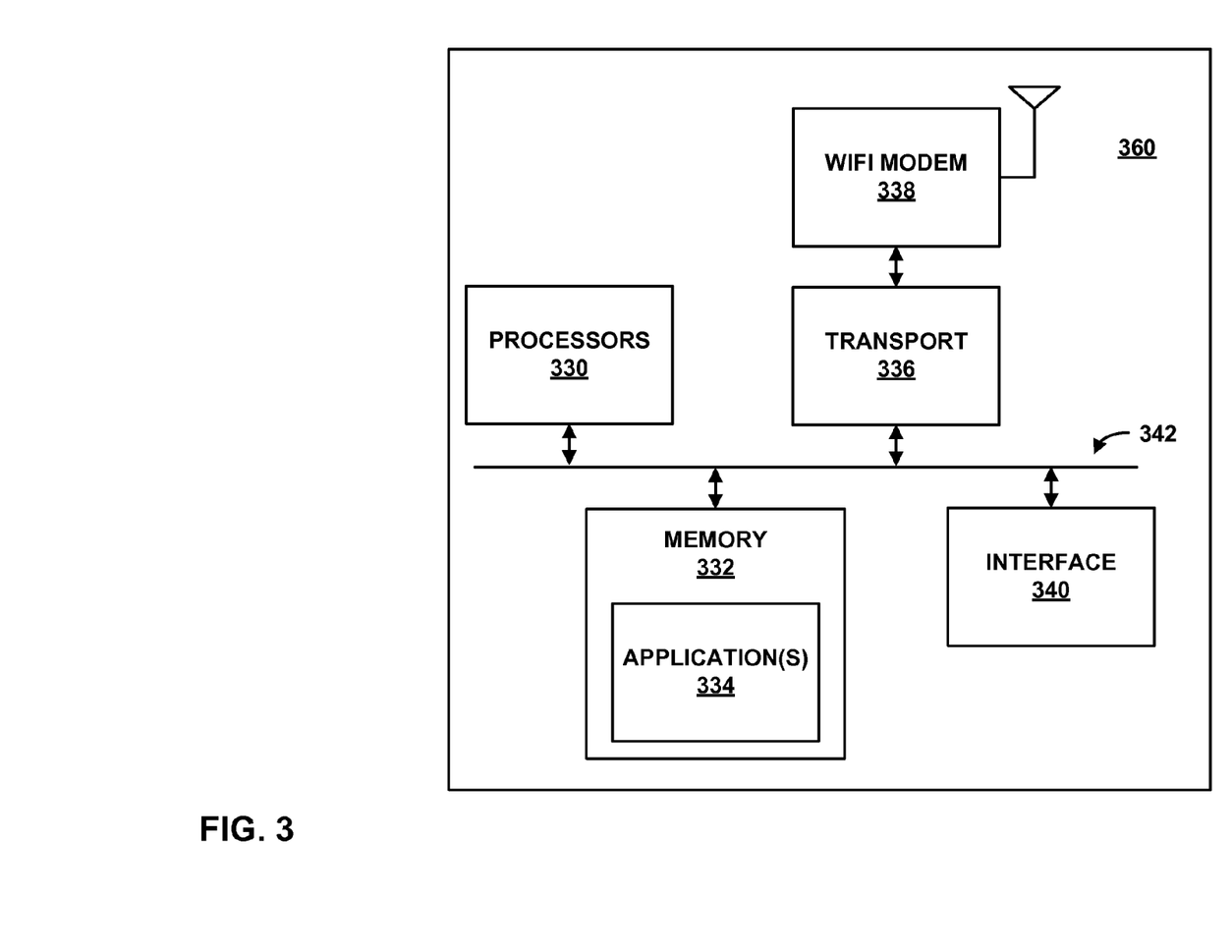
FIG. 3 illustrates an example sink device that may implement techniques of this disclosure.

FIG. 3 shows an example of a sink device 360 that may implement certain techniques of this disclosure. In some examples, sink device 360 may be configured similarly to sink device 160 shown in FIG. 1. In the example shown in FIG. 2, sink device 360 includes one or more processors 330, memory 332 storing one or more applications 334, transport module 336, wireless modem 338, and interface 340. It should be understood that the example shown in FIG. 3, however, is merely one example, and other examples may have more or fewer components than those shown in FIG. 3. For example, as described in greater detail below, while sink device 360 is shown and described in FIG. 3 with respect to a single device, sink device 360 may form a portion of a larger system of inter-operative devices. That is, sink device 360 may be used with more than one separate but inter-operative devices. Accordingly, in some examples, sink device 360 may offload certain A/V processing or other functions to other components connected via interface 340.

Each of components 330, 332, 336, and 340 may be interconnected (physically, communicatively, and/or operatively) for inter-component communications via communication channels 342. In some examples, communication channels 342 may include a system bus, network connection, inter process communication data structure, or any other channel for communicating data.

One or more processors 330 may be capable of processing instructions stored in storage device memory 332. Processors 330 may include, for example, one or more microprocessors, DSPs, ASICs, FPGAs, discrete logic, or any combinations thereof In some examples, processors 330 may be configured to encode and/or decode A/V data for transport, storage, and display.

Memory 332 of FIG. 3 may comprise any of a wide variety of volatile or non-volatile memory, including but not limited to RAM such as SDRAM, ROM, NVRAM, EEPROM, FLASH memory, and the like, Memory 332 may comprise a computer-readable storage medium for storing audio/video data, as well as other kinds of data.

Memory 332 may store applications 334 that are executed by processor 330 as part of performing the various techniques described in this disclosure. In some examples, memory 332 may store certain A/V data for presentation by a device connected to sink device 360 via interface 340. Memory 332 may store an entire A/V file, or may comprise a smaller buffer that simply stores a portion of an A/V file, e.g., streamed from another device or source (such as source device 260, as shown in FIG. 2).

Transport module 336 may receive encapsulated data units from modem 338 and decapsulate the encapsulated data units. For instance, transport module 336 may extract encoded video data from the encapsulated data units and send the encoded A/V data to processor 330 to be decoded and rendered for output. In some examples, transport module 336 may also process encoded A/V data (from another component connected to sink device 360 via interface 340) for network transport. For example, encoded A/V data may be processed by processors 330 and encapsulated by transport module 336 into NAL units for communication across a network. The NAL units may be sent by wireless modem 338 to a wireless source device via a network connection.

Interface 340 may enable sink device 360 to communicate with another external device, such as a device for presenting A/V data received by sink device 360. For example, in some examples, interface 340 may enable sink device 360 to communicate with another device via a wired or wireless protocol. That is, in some examples, interface 340 may be configured for communication via a Universal Serial Bus (USB), USB-2, USB-3, Ethernet, IEEE 1394 ("Firewire"), Thunderbolt, or other wired protocols. In other examples, interface 340 may be configured similarly to modem 338, e.g., for communication via any of a variety of wireless protocols.

According to aspects of this disclosure, sink device 360 may receive certain data that indicates a frame buffer format. For example, as shown in the example of FIG. 1, sink device 360 may receive certain A/V data for presentation by sink device 360 or another device in communication with sink device 360 (e.g., via interface 340). In this example, in addition to frames of video data (as well as audio and other data associated with A/V data) sink device 360 may receive an indication of the format of the frames of video data. The format may be determined according to a frame buffer format detection process, as described above. In some examples, sink device 360 may also receive auxiliary data for manipulating the received A/V data. For example, sink device 360 may receive data for scaling video data, rotating video data, or the like.

In an example for purposes of illustration, sink device 360 may be situated between a source device (such as source device 220) and a presentation device (e.g., a projector or other display). In this example, sink device 360 may be configured as a USB dongle (or other adepter), such that sink device 360 is connected with the projector (or other display) via a USB interface 340. In addition, sink device 360 may communicate with a source device (such as source device 220) using modem 338. Sink device 360 may be responsible for receiving A/V data from a source device, performing one or more operations on the A/V data, and communicating the data to the projector for display. Sink device 360 may determine a format of the A/V data according to received format data. Processors 330 of sink device 360 may perform one or more video encoding, decoding, rendering, and/or buffering functions for supporting playback of video data.

In other examples, wireless sink device 360 may have components in addition to than those shown in FIG. 3. For example, sink device 360 may also receive user input through a user input device such as a touch display, keyboard, mouse, electronic pen or stylus, or voice command module. Such user input may be processed by processor 330, which may then be transported via transport module 336 and modem 338 to a wireless source device over, e.g., a UIBC.

In some examples, according to aspects of this disclosure, sink device 360 may perform certain functions attributed to frame buffer discovery module 250 described with respect to source device 220 above. For example, sink device 360 may remotely determine the format frame buffer 233 by directly writing frames to and reading frames from frame buffer 233, as described in greater detail with respect to FIG. 5 below. In this example, sink device 360 may automatically determine the format of frame buffer 233 upon initial communication with source device 220, thereby determining the format in which A/V data will be later received by sink device 360 and negating the need for explicit format signaling with A/V data.

Figure 4:
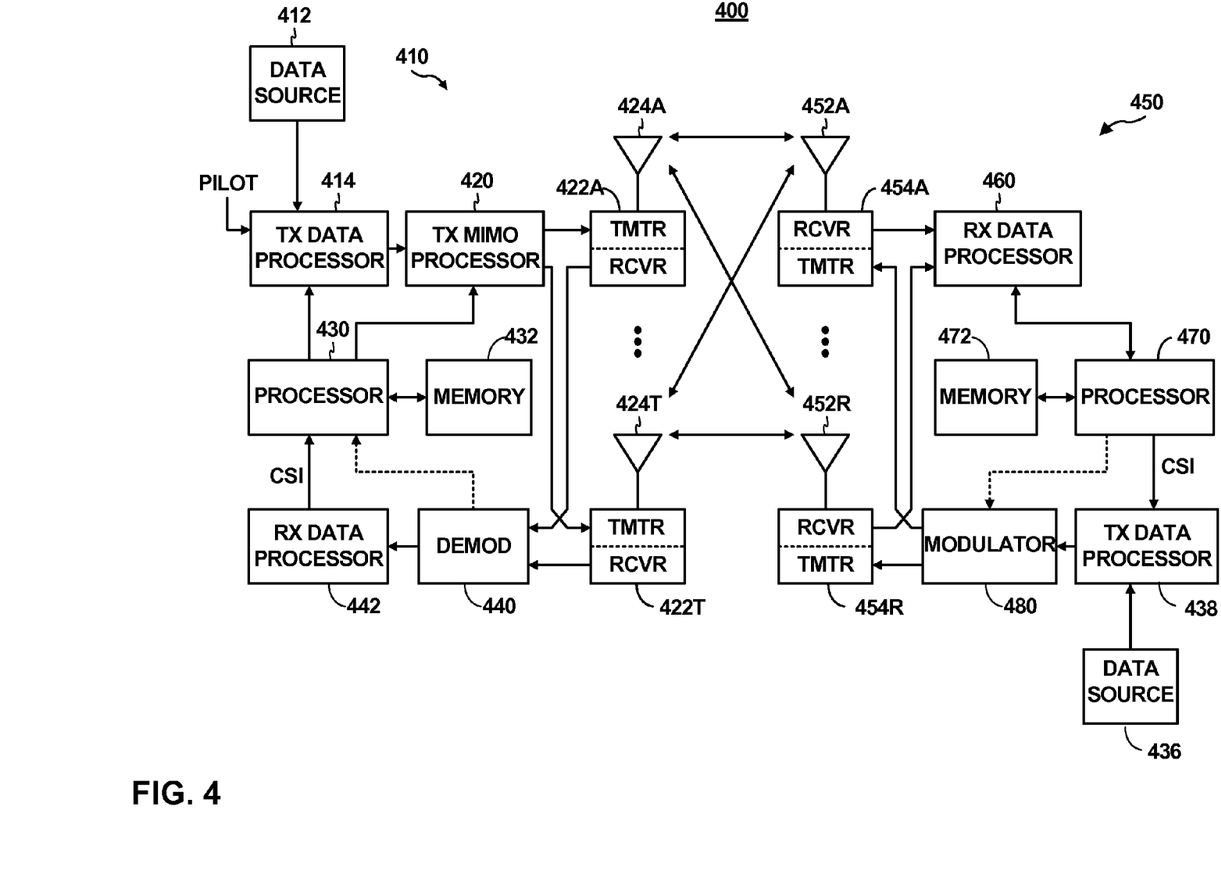
FIG. 4 illustrates an example transmitter system and an example receiver system that may implement techniques of this disclosure.

FIG. 4 shows a block diagram of an example transmitter system 410 and receiver system 450, which may be used by transmitter/receiver 126 and transmitter/receiver 166 of FIG. 1 for communicating over communication channel 150. At transmitter system 410, traffic data for a number of data streams is provided from a data source 412 to a transmit (TX) data processor 414. Each data stream may be transmitted over a respective transmit antenna. TX data processor 414 formats, codes, and interleaves the traffic data for each data stream based on a particular coding scheme selected for that data stream.

The coded data for each data stream may be multiplexed with pilot data using orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

Consistent with FIG. 4, the pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK, or M-QAM (Quadrature Amplitude Modulation), where M may be a power of two) selected for that data stream to provide modulation symbols. The data rate, coding, and modulation for each data stream may be determined by instructions performed by processor 430 which may be coupled with memory 432.

The modulation symbols for the data streams are then provided to a TX MIMO processor 420, which may further process the modulation symbols (e.g., for OFDM). TX MIMO processor 420 can then provides $N_T$ modulation symbol streams to $N_T$ transmitters (TMTR) 422a through 422t. In certain aspects, TX MIMO processor 420 applies beamforming weights to the symbols of the data streams and to the antenna from which the symbol is being transmitted.

Each transmitter 422 may receive and process a respective symbol stream to provide one or more analog signals, and further conditions (e.g., amplifies, filters, and up-converts) the analog signals to provide a modulated signal suitable for transmission over the MIMO channel. $N_T$ modulated signals from transmitters 422a through 422t are then transmitted from $N_T$ antennas 424a through 424t, respectively.

At receiver system 450, the transmitted modulated signals are received by $N_R$ antennas 452a through 452r and the received signal from each antenna 452 is provided to a respective receiver (RCVR) 454a through 454r. Receiver 454 conditions (e.g., filters, amplifies, and down converts) a respective received signal, digitizes the conditioned signal to provide samples, and further processes the samples to provide a corresponding "received" symbol stream.

A receive (RX) data processor 460 then receives and processes the $N_R$ received symbol streams from $N_R$ receivers 454 based on a particular receiver processing technique to provide $N_T$ "detected" symbol streams. The RX data processor 460 then demodulates, de-interleaves and decodes each detected symbol stream to recover the traffic data for the data stream. The processing by RX data processor 460 is complementary to that performed by TX MIMO processor 420 and TX data processor 414 at transmitter system 410.

A processor 470, which may be coupled with a memory 472, periodically determines which pre-coding matrix to use. The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beamforming weights then processes the extracted message.

Figure 5:
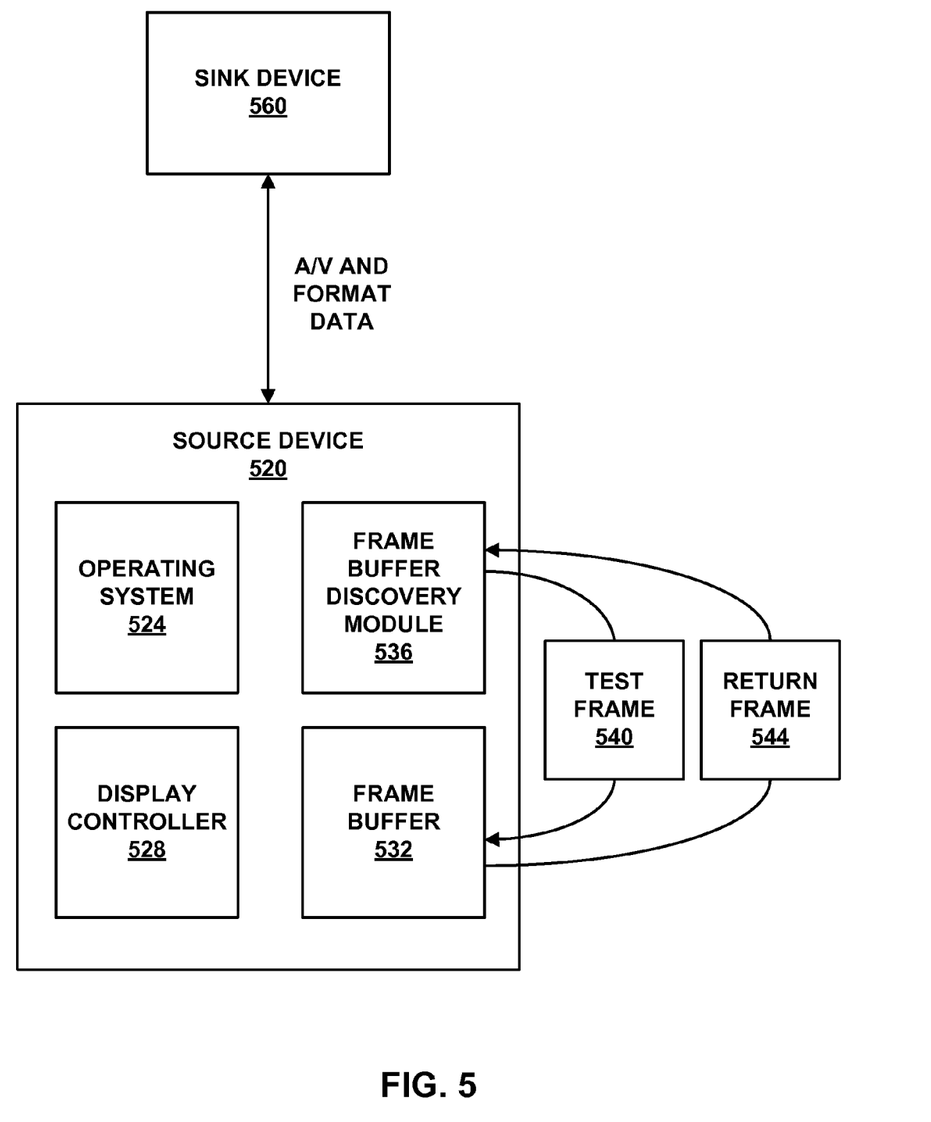
FIG. 5 illustrates an example source device and an example sink device that may implement the techniques of this disclosure.

FIG. 5 illustrates an example of a source device 520 and a sink device 560 that may implement the techniques of this disclosure. According to some examples, source device 520 may be configured similarly to previously described source device 120 (FIG. 1) and/or source device 220 (FIG. 2). Moreover, sink device 560 may be configured similarly to previously described sink device 120 (FIG. 1) and/or sink device 360 (FIG. 3). While FIG. 5 generally includes a simplified representation of source device 520 and sink device 560 for purposes of explanation and clarity, it should be understood that source device 520 and sink device 560 may include additional components not shown in FIG. 5. In the example shown in FIG. 5, source device 520 includes operating system 524, display controller 528, frame buffer 532, and frame discovery module 536.

In general, source device 520 may generate media content (e.g., audio and/or video data) for playback. For example, operating system 524 or another application invoked by operating system 524 may generate one or more frames of video data. As described herein, "video data" may include one or more frames of video data, as well as other images or graphics (e.g., a computer-generated graphics image, a still image, and the like). Display controller 528 may be responsible for rendering the video data, and for storing video data to frame buffer 532. Frame buffer 532 of source device 520 may be configured to store frames of video data in a particular format, such as a particular color space. Examples may include luma-chrominance (YUV or YCbCr), Red Green Blue Alpha (RGBA), Blue Green Red Alpha (BGRA), or any other color space. The format of the frame buffer 532 may be determined by operating system 524, display controller 528, and/or other components of source device 520.

As noted above, video data generated by source device 520 may be displayed at both the source device 520 and sink device 560. In some examples, one or more applications being executed by source device 520 may need to determine the format of frame buffer 532 prior to displaying the video data at source device 520 and/or sink device 560. For example, without knowing the format of video data stored in frame buffer 532, source device 520 and sink device 560 may not be able to appropriately display the video data. Moreover, the format of the frame buffer may not be readily ascertainable by the application being executed by source device 520 or sink device 560.

In an example for purposes of illustration, operating system 524 may instruct display controller 528 and/or other software or hardware components of source device 520 to display text in a frame of video data. Display controller 528 and/or the other software or hardware components are responsible for performing the rendering in a particular format and storing the formatted data to frame buffer 532. While an application being executed by source device 520 may be able to write data to and read data from frame buffer 532, the format of frame buffer 532 may not be ascertainable by the application without interaction with operating system 524, display controller 528, or other components of source device 520. Moreover, source devices 520 having different operating systems 524, display controllers 528, and/or other components may also have different frame buffer formats.

According to aspects of this disclosure, frame buffer discovery module 536 may directly determine the format of frame buffer 532 of source device 520 without communicating with operating system 524 or applications being executed by operating system 524 at source device 520. For example, according to aspects of this disclosure, frame buffer discovery module 536 may automatically determine the format of frame buffer 532, as described in greater detail below.

According to some aspects of this disclosure, frame buffer discovery module 536 may probe frame buffer 532 to determine the format of frame buffer 532. For example, frame buffer discovery module 536 may instruct source device 520 to render a test frame 540 to frame buffer 532 of source device 520. The test frame 540 may be formatted by frame buffer discovery module 536. For example, frame buffer discovery module 536 may format test frame 540 in a known color space arrangement (e.g., known to frame buffer discovery module 536) (e.g., RGB, YUV, YCrCb, and the like). Test frame 568 may be a single, solid color, or may be a number of colors.

Additionally or alternatively, frame buffer discovery module 536 may format test frame 540 to include a known pattern, such as a striped pattern, a checkerboard pattern, or any other pattern. In another example, frame buffer discovery module 536 may format test frame 540 in a known geometrical layout, having a specified width, height, or a particular shape (e.g., with predetermined Xres, Yres, XresV, YresV, Xoffset, Yoffset, BitDepth values). In another example, frame buffer discovery module may format test frame 540 to determine a composition of frame buffer 532 (e.g., to identify a number of displays, a primary/secondary arrangement, a front and back sub-buffer for each frame (using values such as Xoffset or Yoffset), and the like).

In another example, frame buffer discovery module may format test frame 540 to determine frame buffer updating characteristics (e.g., scanning lines, scanning order, 3D display mechanisms such as frame alternate or frame interleaving, and the like). Moreover, while described as a single test frame 540, it should be understood that test frame 568 could include more than one test frame 540, each of which may be formatted the same or differently.

Source device 520 may store test frame 540 to frame buffer 532. That is, operating system 524, display controller 528, and/or other components of source device 520 may store test frame 568 to frame buffer 532 according to the format of frame buffer 532. In examples in which the format of frame buffer is different from the format of test frame 540, display controller 528 may transform test frame 540 to the format of frame buffer 532 prior to storing test frame 540 to frame buffer 532.

Frame buffer discovery module 536 may then request a return frame 544 from source device 520. That is, frame buffer discovery module 536 may request the test frame data in the format in which test frame 540 was stored. In some examples, frame buffer discovery module 536 read return frame 544 directly from frame buffer 532. Return frame 544 is formatted according to the format of frame buffer 532. Frame buffer discovery module 536 may then compare the format of return frame 544 to the format of test frame 540 to determine the format of frame buffer 532.

For example, if the format of the return frame 544 is the same as the format of test frame 540 (i.e., return frame 544 matches test frame 540), frame buffer discovery module 536 may determine that the format of frame buffer 532 is the same as the format of test frame 540. If the format of return frame 544 is different than the format of test frame 540, frame buffer discovery module 536 may perform one or more calculations to determine the frame format of frame buffer 532 based on the differences between the frames. In an example, frame buffer discovery module 536 may store a number of known transformations between one format and another format that were generated, for example, in a test environment with two known frame formats. In another example, frame buffer discovery module 536 may repeat the process of transmitting test frames 540 and receiving return frames 544 until the format of a test frame 540 matches the format of a return frame 544.

In an example for purposes of illustration, operating system 524 may store video data to frame buffer 532 in either an RGBA8888 or a BGRA8888 format. According to aspects of this disclosure, frame buffer discovery module 536 may write one or more test frames 540 having a predetermined format to frame buffer 532. Frame buffer discovery module 536 may then read the one or more frames from frame buffer 532 (one or more return frames 544) to determine the format of frame buffer 532. If, for example, frame buffer discovery module 536 writes a test frame 540 having an RGBA8888 format to frame buffer 532 and return frame 544 has the same format, frame buffer discovery module 536 may determine that the format of frame buffer 532 is RGBA8888. If, however, return frame 544 is formatted in reverse, frame buffer discovery module 536 may determine that the format of frame buffer 532 is BGRA8888. Frame buffer discovery module 536 may also repeat the process with one or more additional test frames 540 to determine the format of frame buffer 532.

After determining the format of frame buffer 532, source device 520 may send data to sink device 560 identifying the format. Sink device 560 may use the data identifying the format of frame buffer 532 to configure a display controller or other component of sink device 560 to display data in the format of frame buffer 532. Accordingly, sink device 560 may receive video data from source device 520 (in the format of frame buffer 532) and display the video data. That is, in an example, source device 520 may encode video data in the format of frame buffer 532 and send the encoded data, as well as data identify the format of the encoded video data to sink device 560. Sink device may receive the data identifying the format of the encoded data, decode the encoded data, and display the data.

Source devices, such as source device 520, may execute a variety of operating systems, have different screen geometry, use different color space conversions, host different application processors, and the like, which may contribute to the format of frame buffer 532. These and other attributes may increase the complexity of determining how the pixels in a frame buffer, such as frame buffer 532 are represented. Determining the frame buffer format without specifically communicating with operating system 524 or display controller 528 may reduce the need for an application developer to know the format of the frame buffer of source device 520. Moreover, the process of determining the format of frame buffer 532 may be carried out regardless of the operating system 524, the configuration of display controller 528, or the configuration of any other components of source device 520 responsible for rendering video data. Accordingly, an application being executed by a source device, such as source device 520, may be able to display content at source device 520 and/or sink device 560 without knowing which operating system 524, display controller 528, or other rendering components are included in source device 520. In this way, frame buffer discovery module 536 frees an application being executed by source device 520 from performing a platform capability inquiry, thereby achieving platform independence (e.g., from a particular platform of source device 520).

Figure 6:
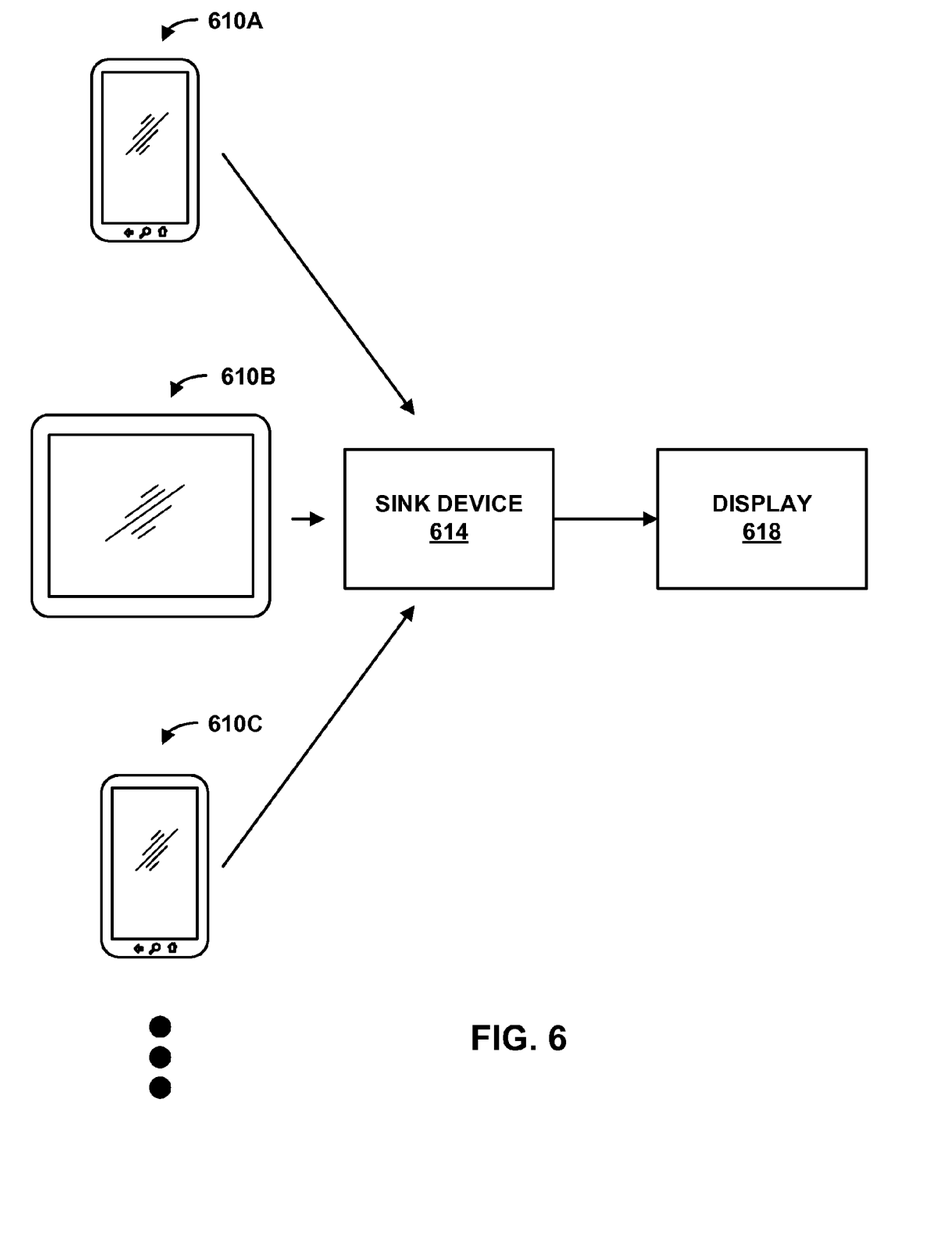
FIG. 6 illustrates an example of a plurality of source devices and an example sink device that may implement the techniques of this disclosure.

FIG. 6 illustrates an example of a plurality of source devices and an example sink device that may implement the techniques of this disclosure. For example, source devices 610A-610C (collectively, source devices 610) may communicate A/V data to sink device 614 for presentation by display 618.

As shown in FIG. 6, the displays (and corresponding frame buffers) of respective source devices 610 may have a variety of dimensions and configurations. Accordingly, according to aspects of this disclosure, source devices 610 and/or sink device 614 may poll the respective frame buffers of source devices 610 (using a frame buffer discovery process, as described above) to determine the format of the frame buffers.

In some examples, source devices 610 may determine dimensions, orientations, and other format related data and transmit such data to sink device 614 with A/V data. Sink device 614 may perform one or more operations on received A/V data, such as scaling, rotation, up-sampling, down-sampling, format conversion, and the like, before sending the A/V data to display 618. Display 618 may then present the A/V data received from sink device 614.

In some examples, sink device 614 may send A/V data to display 618 as received from source device 610. In this example, sink device 614 may center-clip A/V data to fit on display 618 in the native resolution. In another example, sink device 614 may perform a stretching operation on A/V data received from source device 610, such that A/V data fits the entire display 614. In still another example, sink device 614 may dimensionally scale A/V data received from source device, such that A/V data is maximized at display 614 while the aspect ratio is maintained.

While shown separately for purposes of explanation, it should be understood that, in other examples, sink device 614 may be incorporated in the same device with display 618.

Figure 7:
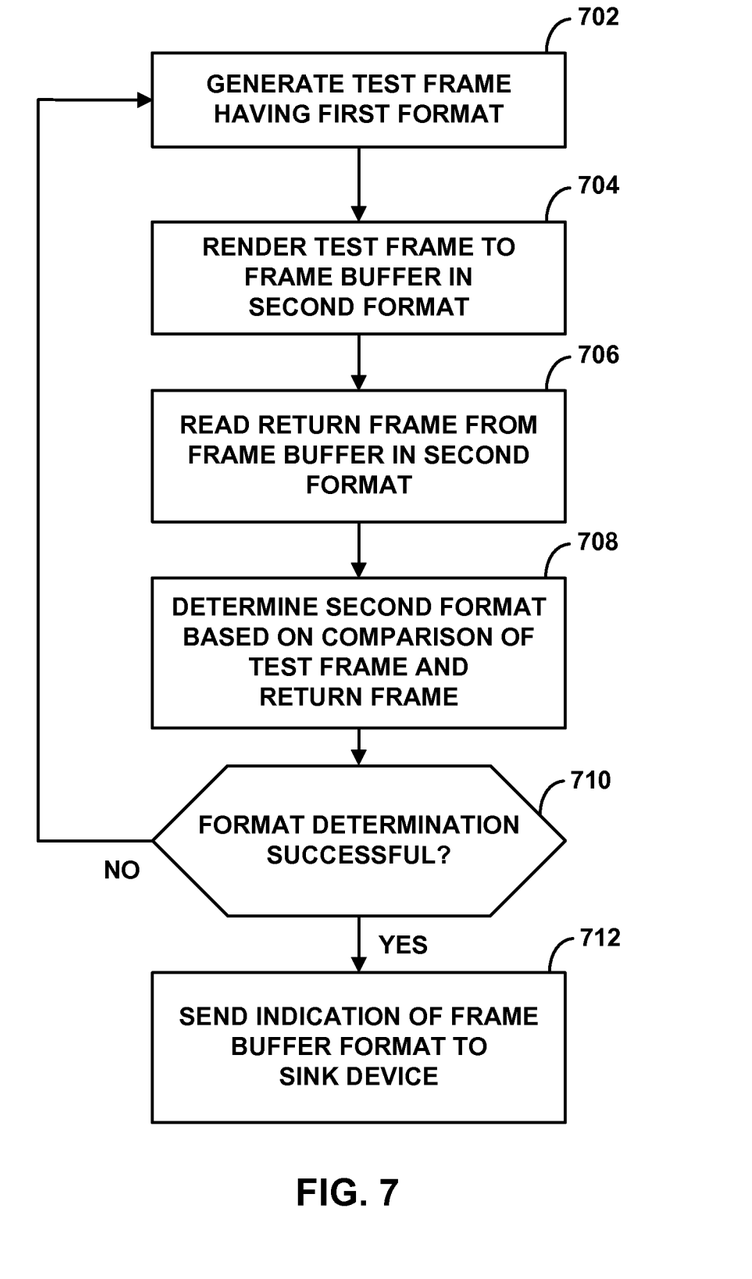
FIG. 7 is a flowchart that illustrates an example method according to aspects of this disclosure.

FIG. 7 is a flowchart that illustrates an example method of determining a format of a frame buffer, according to aspects of this disclosure. While the example shown in FIG. 7 is described as being carried out by source device 520 and sink device 560, it should be understood that the process shown and described with respect to FIG. 7 may be carried out by a variety of other devices including, for example, source devices 120 and 220 and sink devices 160 and 360, or a variety of other computing devices.

Frame buffer discovery module 536 of source device 520 initially generates a test frame having a first format (702). For example, frame buffer discovery module 536, which may be an application being executed by source device 520, may generate a test frame that has a predetermined format. The format may include a predetermined colorspace and may include a predetermined orientation, geometry, and the like.

According to the example shown in FIG. 7, source device 520 then writes the test frame to frame buffer 532 of source device 520 in a second format, which may be different than the first format (704). The second format may be, for example, a format that is specific to operating system 524 or display controller 528 of source device 520 or other component of the platform of source device 520. That is, in writing the test frame to frame buffer 532, source device 520 may alter one or more characteristics of test frame, such that the test frame is stored in a second format that may differ from the first format.

Frame buffer discovery module 536 of source device 520 then reads a return frame out of the frame buffer 532 in the second format (706). That is, the return frame may include the data of the test frame that is formatted according to the format of frame buffer 532. Frame buffer discovery module 536 may also determine the second format based on a comparison of the first format of the test frame to the second, received format of the return frame (708). That is, frame buffer discovery module 536 may determine the second format based on similarities or differences between the second format and the first format. If the first format is the same as the second format, frame buffer discovery module 536 may determine that the format of frame buffer 532 is the same as the format of the test frame. If the first format is different from the second format, frame buffer discovery module 536 may perform one or more additional operations to determine the format of frame buffer 532, as described below.

Source device 520 may determine whether the format determination was successful (710). For example, frame buffer discovery module 536 may determine that the determination was successful if the format of the test frame matches the format of the test frame (indicating that the format of frame buffer 532 is the same as the same as the test frame). Frame buffer discovery module 532 may also determine that the determination was successful if the format of frame buffer can be ascertained based on the differences between the test frame and the return frame (e.g., based on a predetermined transformation between the test frame and the return frame).

If the format determination was not successful (the NO branch of step 710), source device 520 may generate a new test frame and repeat the process. That is, source device 520 may repeat the process until either the format of the test frame matches the format of the return frame or the format can be ascertained based on the differences between the test frame and the return frame. If the format determination was successful (the YES branch of step 710), source device 520 may send an indication of the format to a sink device (such as sink device 560) (712). Sink device 560 may then display video data from source device 520 in the appropriate format.

It should be understood that the steps shown and described with respect to FIG. 7 are provided as merely one example. That is, the steps of the method of FIG. 7 need not necessarily be performed in the order shown in FIG. 7, and fewer, additional, or alternative steps may be performed.

It should also be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

Generally, functionality and/or modules described herein may be implemented in either or both of the wireless source device and wireless sink device. In this way, user interface capabilities described in the current example may be used interchangeably between the wireless source device and wireless sink device.

Moreover, in one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method comprising:
generating a test frame of video data having a first format;
rendering the test frame of video data directly to a frame buffer, wherein the frame buffer is configured to store video data in a second format;
reading, from the frame buffer, a return frame of video data, wherein the return frame of video data comprises the video data of the test frame formatted in the second format; and
determining the second format based on a comparison of the test frame having the first format and the return frame having the second format.

2. The method of claim 1, wherein determining the second format based on the comparison comprises determining whether the test frame having the first format matches the return frame having the second format.

3. The method of claim 2, further comprising, when the test frame having the first format matches the return frame having the second format, generating one or more frames of video data in the second format for transmission to a sink device.

4. The method of claim 2, further comprising, when the test frame having the first format does not match the return frame having the second format, repeating the rendering, reading, and determining steps with one or more additional test frames having respective different formats until a format of the one or more additional test frames matches the second format.

5. The method of claim 1, further comprising indicating the second format to a sink device for rendering images at the sink device.

6. The method of claim 5, further comprising indicating a scaling factor to the sink device for scaling the images at the sink device.

7. The method of claim 1, wherein rendering the test frame directly to the frame buffer comprises rendering the test frame directly to the frame buffer without communicating the test frame through an operating system.

8. The method of claim 1, wherein the test frame of video data comprises an image in a predetermined color space.

9. The method of claim 1, wherein the test frame of video data comprises an image having a predetermined geometrical pattern.

10. An apparatus comprising one or more processors configured to:
generate a test frame of video data having a first format;
render the test frame of video data directly to a frame buffer, wherein the frame buffer is configured to store video data in a second format;
read, from the frame buffer, a return frame of video data, wherein the return frame of video data comprises the video data of the test frame formatted in the second format; and
determine the second format based on a comparison of the test frame having the first format and the return frame having the second format.

11. The apparatus of claim 10, wherein, to determine the second format based on the comparison, the one or more processors are configured to determine whether the test frame having the first format matches the return frame having the second format.

12. The apparatus of claim 11, wherein the apparatus comprises a source device, and wherein the one or more processors are further configured to, when the test frame having the first format matches the return frame having the second format, generate one or more frames of video data in the second format for transmission to a sink device.

13. The apparatus of claim 11, wherein the one or more processors are further configured to, when the test frame having the first format does not match the return frame having the second format, repeat the rendering, reading, and determining using one or more additional test frames having respective different formats until a format of the one or more additional test frames matches the second format.

14. The apparatus of claim 10, wherein the apparatus comprises a source device, and wherein the one or more processors are further configured to indicate the second format to a sink device for rendering images at the sink device.

15. The apparatus of claim 14, wherein the one or more processors are further configured to indicate a scaling factor to the sink device for scaling the images at the sink device.

16. The apparatus of claim 10, wherein, to render the test frame directly to the frame buffer, the one or more processors are configured to render the test frame directly to the frame buffer without communicating the test frame through an operating system.

17. The apparatus of claim 10, wherein the test frame of video data comprises an image in a predetermined color space.

18. The apparatus of claim 10, wherein the test frame of video data comprises an image having a predetermined geometrical pattern.

19. The apparatus of claim 10, wherein the apparatus comprises a frame buffer discovery module configured to generate the test frame, render the test frame to the frame buffer, read the return frame of video data, and determine the second format based on a comparison of the test frame and the return frame.

20. A computer program product comprising a non-transitory computer-readable medium having stored thereon instructions that, when executed, cause one or more processors to:
generate a test frame of video data having a first format;
render the test frame of video data directly to a frame buffer, wherein the frame buffer is configured to store video data in a second format;
read, from the frame buffer, a return frame of video data, wherein the return frame of video data comprises the video data of the test frame formatted in the second format; and
determine the second format based on a comparison of the test frame having the first format and the return frame having the second format.

21. The computer program product of claim 20, wherein, to determine the second format based on the comparison, the instructions cause the one or more processors to determine whether the test frame having the first format matches the return frame having the second format.

22. The computer program product of claim 21, wherein the instructions further cause the one or more processors to, when the test frame having the first format matches the return frame having the second format, generate one or more frames of video data in the second format for transmission to a sink device.

23. The computer program product of claim 21, wherein the instructions further cause the one or more processors to, when the test frame having the first format does not match the return frame having the second format, repeat the rendering, reading, and determining using one or more additional test frames having respective different formats until a format of the one or more additional test frames matches the second format.

24. The computer program product of claim 20, wherein the instructions further cause the one or more processors to indicate the second format to a sink device for rendering images at the sink device.

25. The computer program product of claim 24, wherein the instructions further cause the one or more processors to indicate a scaling factor to the sink device for scaling the images at the sink device.

26. The computer program product of claim 20, wherein, to render the test frame directly to the frame buffer, the instructions cause the one or more processors to render the test frame directly to the frame buffer without communicating the test frame through an operating system.

27. The computer program product of claim 20, wherein the test frame of video data comprises an image in a predetermined color space.

28. The computer program product of claim 20, wherein the test frame of video data comprises an image having a predetermined geometrical pattern.

29. An apparatus comprising:
  means for generating a test frame of video data having a first format;
  means for rendering the test frame of video data directly to a frame buffer, wherein the frame buffer is configured to store video data in a second format;
  means for reading, from the frame buffer, a return frame of video data, wherein the return frame of video data comprises the video data of the test frame formatted in the second format; and
  means for determining the second format based on a comparison of the test frame having the first format and the return frame having the second format.

30. The apparatus of claim 29, wherein means for determining the second format based on the comparison comprises means for determining whether the test frame having the first format matches the return frame having the second format.

31. The apparatus of claim 30, further comprising, when the test frame having the first format matches the return frame having the second format, means for generating one or more frames of video data in the second format for transmission to a sink device.

32. The apparatus of claim 30, further comprising, when the test frame having the first format does not match the return frame having the second format, means for repeating the rendering, reading, and determining with one or more additional test frames having respective different formats until a format of the one or more additional test frames matches the second format.

33. The apparatus of claim 29, further comprising means for indicating the second format to a sink device for rendering images at the sink device.

34. The apparatus of claim 33, further comprising means for indicating a scaling factor to the sink device for scaling the images at the sink device.

35. The apparatus of claim 29, wherein the means for rendering the test frame directly to the frame buffer comprises means for rendering the test frame directly to the frame buffer without communicating the test frame through an operating system.

36. The apparatus of claim 29, wherein the test frame of video data comprises an image in a predetermined color space.

37. The apparatus of claim 29, wherein the test frame of video data comprises an image having a predetermined geometrical pattern.

* * * * *